United States Patent Office 3,451,650
Patented June 24, 1969

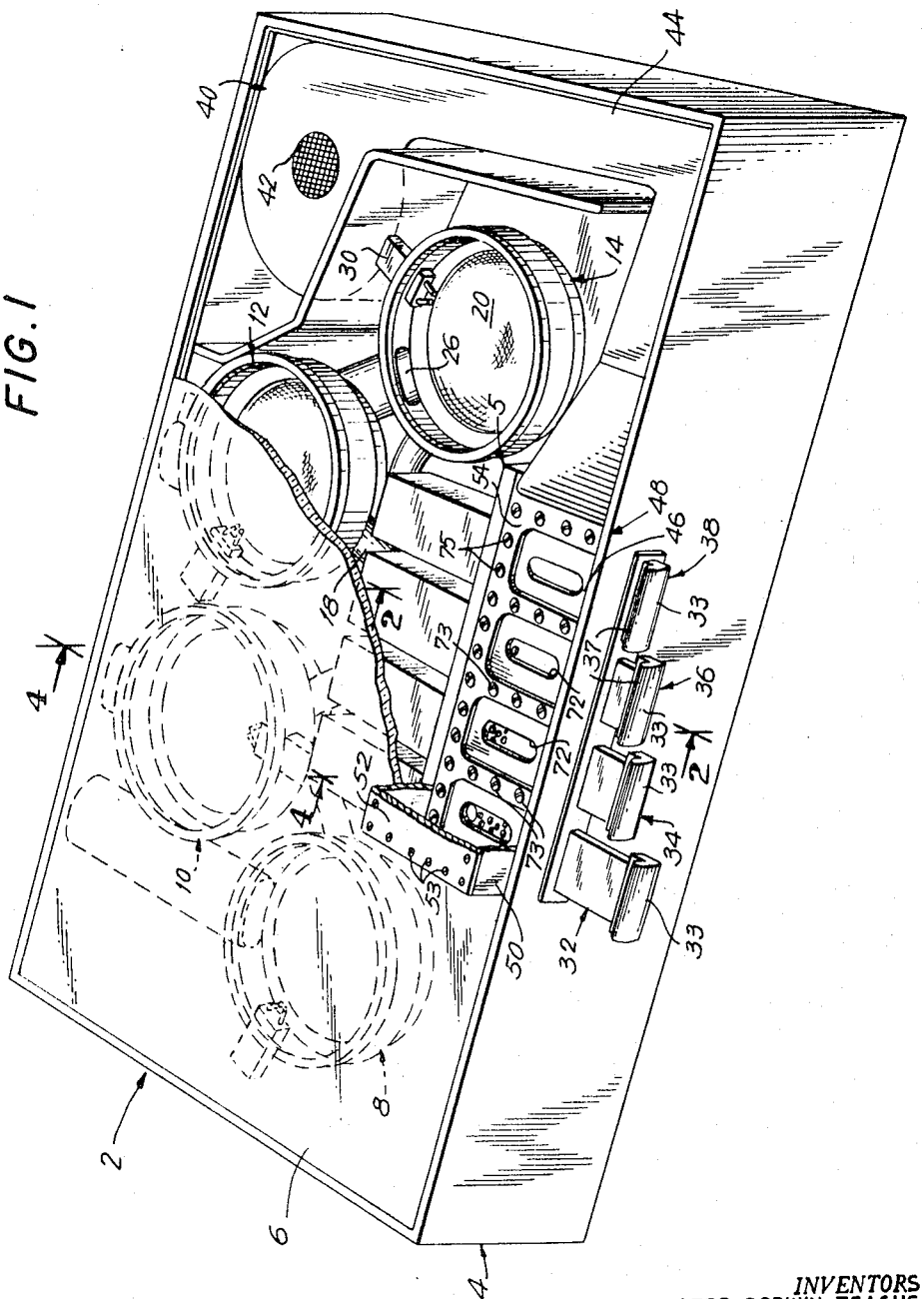

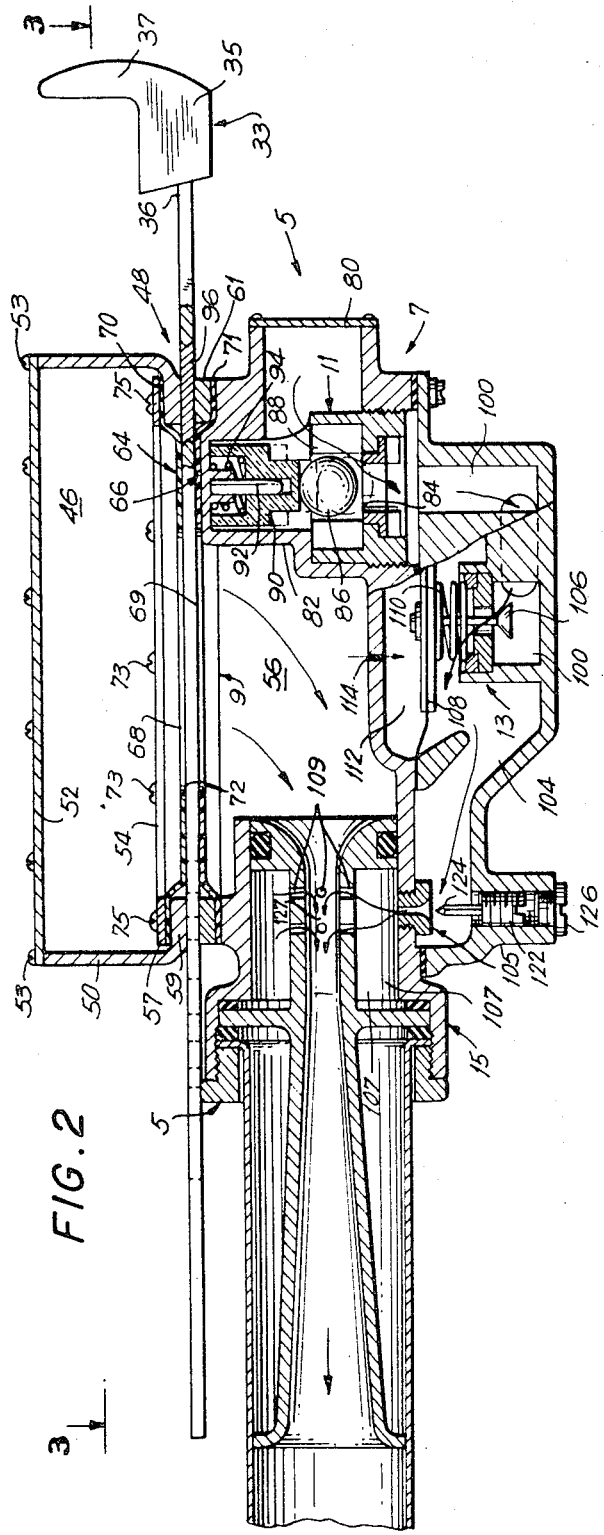

3,451,650
MAGNETIC SHUTOFF VALVE PARTICULARLY
FOR CONTROLLING A GAS SUPPLY
Walter Dorwin Teague, Jr., Nyack, and Anthony P.
Montalbano, Fresh Meadows, N.Y., assignors to Columbia Gas System Service Corporation, New York,
N.Y., a corporation of Delaware
Filed Jan. 23, 1967, Ser. No. 610,982
Int. Cl. F16k 31/08
U.S. Cl. 251—65                                8 Claims

ABSTRACT OF THE DISCLOSURE

A magnetically operated valve is disclosed for controlling the supplying of gas to a burner unit. The valve is formed by a steel ball resting upon a valve seat. The valve is opened by the action of a magnet which lifts the ball from the seat. The movement of the magnet is under the control of a slide or plate which slides along the magnet opposite the ball, and which has one portion which is nonmagnetic and another portion which is magnetic. When the magnetic portion of the slide is adjacent the magnet, the valve is opened by the action of the magnet moving itself toward the slide and carrying the ball with it. When the non-magnetic portion of the slide is adjacent the magnet, the valve is closed by a spring or gravity urging the ball and magnet away from the slide.

Specification

This invention is related to that disclosed in the copending application of the present inventors and Charles W. Fromm, Ser. No. 610,980, filed Jan. 23, 1967, having a common assignee herewith.

This invention relates to valves, and more in particular to valves which move between fully opened and fully closed positions and are of the type which are adaptable for use as supply valves or cutoff valves for gas appliances, such as ranges and stoves.

An object of this invention is to provide improved control valves. Another object is to provide cutoff valves of the type which may be used in gas appliances. A further object is to provide improved valves which may be used as components of control systems for gas appliances. A further object is to provide simple and sturdy valves which are hermetically sealed in the sense that there is no packing or moving seal. A further object is to provide for the above with structure which is compact and adaptable to various conditions of operation and use. These and other objects will be in part obvious and in part pointed out below.

In the drawings:

FIGURE 1 is a perspective view with parts broken away of a flat-top stove or range in which one embodiment of the invention is incorporated;

FIGURE 2 is a sectional view on the line 2—2 of FIGURE 1; and,

FIGURE 3 is a sectional view on the line 3—3 of FIGURE 2.

Referring to FIGURE 1 of the drawings, a flat-top stove or cooking range 2 has a base shell construction 4 with a flat top 6 in the form of a plate of heat resistant glass which transmits radiant heat as well as heat by conduction. Positioned directly beneath plate 6 are four infrared radiant burner units 8, 10, 12 and 14, which are identical, and of the construction of unit 12 which is shown in FIGURE 4. Stove or range 2 includes a control housing 5 centrally positioned in the front of the base shell construction (see FIGURE 2). Control housing 5 encloses a gas and air control assembly 7 including for each of the burner units an air flow control valve 9, a gas cutoff valve 11, a gas-flow pressure regulator 13 and a gas-mixing venturi 15. Venturi unit 15 maintains a near stoichiometric mixture ratio of the gas and air for infrared radiation operation of its burner unit. The illustrative embodiment of the present invention is the gas cut-off valve 11 and its operating mechanism. However, in explaining the present invention, it seems desirable to first describe the stove or cooking range 2 and its operation.

Referring again to FIGURE 1, the operation of each of the burner units 8, 10, 12 and 14 is under the respective control of slides 32, 34, 36 and 38 (see also FIGURE 2) mounted at the top of the control housing 5. These slides are identical and each of them may be moved, as represented in FIGURE 1, from the fully closed or off position of slide 38 to the fully open position of slide 32. Each of these slides controls the supplying of gas and air to its burner unit, and it also energizes the igniter unit. Positioned to the rear of burner unit 14 is a blower 40 which draws in fresh air at 42 and delivers it under pressure through a conduit 44 to an air supply manifold 46 (see also FIGURE 2) of the air supply control assembly 48.

Manifold 46 has a side wall 50 and a top wall 52 which is mounted thereon by a row of screws 53. The bottom of the manifold is formed by a valve plate 54 which has four rectangular openings respectively in alignment with slides 32, 34, 36 and 38, and there is a rim 57 which overlies a flange 59 at the bottom of wall 50. Positioned beneath the manifold is a valve plate 61 which is generally coextensive with valve plate 54 and which has slots in which the slides are mounted. Mounted respectively above and below each of the slides and mounted back to back is a pair of identical Teflon diaphragms 64 and 66. Each diapragm has a central flat sealing portion (68 and 69, respectively), resting against the surface of the slide and a peripheral flange (70 and 71, respectively). Flange 70 is positioned between flange 59 of manifold 46 and valve plate 54, and flange 71 is positioned between valve plate 61 and a coextensive top surface of control housing 5. As shown best in FIGURES 1 and 3, the valve plates and the manifold are clamped to the top of the control housing 5 by five rows of screws 73 which are parallel to the edges of the slides, respectively, between the slides and at the ends of the manifold. Additional screws 75 clamp valve plate 54 to flange 59. Hence, the periphery of each of the diaphragm is clamped by its valve plate and its central portion is somewhat resiliently supported in contact with the surface of its slide.

Each of the diaphragms has a centrally positioned and somewhat rectangular or oblong opening 72 which is closed by the slide when the slide is positioned in the fully closed position shown. At the left of the center of the slide there is a series of holes or orifices 74 through the slide, which bear subnumbers 1 to 8. Hence, as the slide is moved to the right from the position shown in FIGURES 2 and 3, hole $74_1$ first moves into alignment with or is exposed to openings 72 in its diaphragms 64 and 66, thus to provide an orifice or opening from manifold 46 to manifold 56. Upon further movement additional orifices are exposed to the openings 72 in the two diaphragms, thus providing for the increase of the flow of air into manifold 56, with the maximum being when all of the orifices 74 are exposed to the openings 72.

Diaphragms 64 and 66 provide very satisfactory seals for their respective manifolds, and they provide for free movement so that the slide may be positioned very easily with great accuracy. Also, when there is pressure within the manifold, the diaphragm is pressed against the slide so as to insure the proper sealing. The sizes and positioning of the orifices 74 are such as to provide a predetermined increase in the rate of flow of air into manifold 56 as the slide is moved toward its fully opened position. The slide bears indicia in the form of numbered lines to aid in providing the desired rate of flow. As will be further explained below, the rate of flow of the air determines the rate of flow of the gas to the burner unit and therefore controls the operation of the burner unit from the standpoint of the amount of heat produced. Each of the slides (see FIGURES 2 and 3) has a handle 33 with a main body portion 35 and an upturned flange 37 which is grasped by the fingers to move the slide between the fully closed and fully opened positions. It has been found that this particular handle is ideal for quick and accurate adjustment of the slides. Also, when all of the slides are in the fully closed position, the flanges 37 of the various handles are in alignment. Hence, if any of the slides is not in its fully closed position, it will be quickly apparent to the observer.

As shown in the right-hand portion of FIGURE 2, gases are supplied to the stove through a horizontal gas-supply manifold 80 extending along the front of the stove and connected to each of the gas cut-off valves 11. Each of the gas cutoff valves has a nonmagnetic body 82 with the valve closure being formed by a valve seat 84 and a steel ball 86 which is moved from and to the valve seat to open and close the valve. When the valve is in the open position as shown in full lines, gas flows from manifold 80 to the left through a passageway 88 and downwardly around ball 86 and past the valve seat through the valve opening to a gas supply chamber 100. The valve is opened and closed by the action of a cylindrical magnet 90 which is slidable vertically in the housing and guided by a pin 92 mounted at its upper end.

Magnet 90 and ball 86 are urged downwardly by gravity and by a coil spring 94 mounted in the upper end of the magnet and they move upwardly only when the magnet is attracted by magnetic material above it. Accordingly, the slide 36 is of magnetic steel and it has a disk insert 96 of nonmagnetic material which is moved into axial alignment with magnet 90 when the slide is in the fully closed position. Hence, when a slide is positioned as shown in FIGURE 2 or further to the right, magnet 90 is attracted to the slide and it lifts itself upwardly to the position of FIGURE 2 and carries with it the steel ball 86 so as to open the valve. However, when any of the slides is moved to the fully closed position, the non-magnetic disk 96 is in axial alignment with magnet 90 and the magnet is no longer drawn upwardly by attraction to the slide and it moves downwardly by the combined action of gravity and spring 94 and closes the valve.

Magnet 90 tends to hold ball 86 with the center of the ball in alignment with the axis of the magnet. However, the magnet has a flat-bottom surface upon which the ball is free to roll. Therefore, when the ball is projected downwardly toward the valve seat, it nests on the valve seat as shown in broken lines, with its center in exact alignment with the axis of the valve seat. Hence, the ball will always move to a position wherein it completely mates with the valve seat, and it is held against the valve seat by the gas pressure above it, as well as by the force of spring 94 and the weights of the ball and the magnet.

Magnet 90 is of the ceramic type which maintains its magnetism without diminution during normal usage. However, when this magnet is heated to a temperature of the order of 450° F. the magnetism is destroyed. Hence, if valve 11 is open and magnet 90 is heated to that critical temperature, the magnet loses its magnetism, and valve 11 is closed in the same manner as if slide 36 were moved to its "off" position. Therefore, valve 11 is adapted to act as a safety cutoff valve if it is installed in such a manner as to be heated by the malfunctioning of its burner unit.

With this arrangement, the first movement of any of the slides from its fully closed position opens its gas cutoff valve 11 so as to permit gas to flow from the manifold 80 to the supply chamber 100. The gas flowing into supply chamber 100 passes through gas-flow regulator 13 and a chamber 104 to the venturi unit 15. Regulator 13 restricts the flow in a manner which is dependent upon the air pressure in manifold 56, namely, so as to maintain the gas pressure in chamber 104 at all times equal to the air pressure in manifold 56. Regulator 13 has a movable member 106 carried upon a stem from a diaphragm 108. Diaphragm 108 is urged upwardly by the gas pressure in chamber 104 with the aid of a coil spring 110, and it is urged downwardly by the pressure of the air in a chamber 112 above the diaphragm. Chamber 112 is connected to manifold 56 through a small opening 114, so that the air pressure in chamber 112 is the same as in manifold 56, except that the small size of opening 114 dampens the response to changes in the air pressure. Hence, when the air supply to a manifold 56, is reduced, the reduced pressure in chamber 112 permits spring 110 to move member 106 upwardly so as to reduce the rate of gas flow. However, when the slide is moved outwardly so as to increase the rate of air flow, the pressure in manifold 56 is increased and there is the same increase in the pressure in chamber 112 which acts upon diaphragm 108 to increase the gas flow. In this way regulator 13 acts automatically at all times to maintain the gas pressure in chamber 104 equal to the air pressure in manifold 56.

From chamber 104 the gas flows through orifice 105 to an annular chamber 107 and thence through a plurality of radial holes 109 where it joins the stream of air flowing to the burner unit. Orifice 105 has the characteristic that when the pressure in chamber 104 is equal to the pressure in manifold 56 gas is delivered to the air stream in the desired ratio. Hence, with the position of slide 36 controlling the rate at which air flows to the burner unit, the air pressure in manifold 56 acts through regulator 13 to produce an equal gas pressure in chamber 104, and there is a resultant gas flow through orifice 105 which gives the desired gas-air mixture to the burner unit. The respective mass flows of air as $W_a$ and gas as $W_g$ may be expressed as follows:

$$W_a = F_1 (P_{56} - P_{127})^{1/2}$$
$$W_g = F_2 (P_{104} - P_{107})^{1/2}$$

$F_1$ and $F_2$ are constants, and P represents the pressure in the correspondingly numbered zone. Regulator 13 insures that $P_{104}$ equals $P_{56}$. Holes 109 are relatively large in relation to the amount of gas flowing through them, so that $P_{127}$ in the venturi throat equals $P_{107}$. Therefore $(P_{56} - P_{127})^{1/2} = (P_{104} - P_{107})^{1/2}$ and so $$W_a / W_g = F_1 / F_2$$

In other words the mixture ratio of gas and air is a constant and depends on the values of $F_1$ and $F_2$. The actual value of $F_2$ is dependent on the size of the orifice 105 so that by selecting various sizes of orifice 105 the mixture ratio of gas and air can be varied to suit the particular type of gas available. Also a restricting screw 122 may be adjusted so that its needle end 124 projects into the entrance to the orifice so as to adapt the orifice for the alternative gas supply. For this adjustment a screw plug 126 is provided which may be removed.

The present invention relates to the gas cutoff valve 11. While the illustrative embodiment of the invention is a household or commercial range, the valve is adaptable for other uses, and the scope of the invention is set forth in the claims.

What is claimed is:

1. In a valve construction, the combination of, a valve body having a fluid passageway therethrough and a valve seat which has a central axis and through which the passageway extends, said valve body having a wall of nonmagnetic material spaced axially with respect to said valve seat with a valve-operating chamber positioned therebetween, a movable valve member which is adapted to be moved along said axis from a closed-valve position wherein it rests upon said valve seat and closes said passageway and an open-valve position wherein it is spaced from said valve seat axially toward said wall of nonmagnetic material, a magnet positioned between said valve member and said wall and adapted to move along said axis from and to said wall and to carry with it said valve member to and from said closed-valve position, and operating means including a movable operating element and mounting means therefore with said movable element including a magnetic portion which is moved adjacent said wall to attract said magnet to its position adjacent said wall to thereby move said valve element to said open-valve position.

2. A valve construction as described in claim 1 wherein said movable valve element is a steel ball and said magnet presents an end surface to said steel ball whereby said steel ball is held to said magnet with its center substantially on said axis and whereby said ball is permitted to roll upon said end surface to securely nest upon said valve seat.

3. A valve construction as described in claim 1 wherein said operating element is a slide which is mounted to move transversely of said axis and which has portions of magnetic material and nonmagnetic material which are positioned respectively adjacent said wall.

4. A valve construction as described in claim 3 wherein said magnet is a cylindrical member with a central bore adjacent said wall, and a guide pin extending between said magnet and said wall and guiding the movement of said magnet.

5. A valve construction as described in claim 1 which includes a coil spring positioned between said wall and said magnet and urging said magnet away from said wall.

6. In a valve construction, the combination of, a supply means, means forming a discharge passageway, a valve body providing a valve passageway between said supply means and said discharge passageway and having a valve seat which provides a valve closure, a steel ball which is adapted to be moved between a closed-valve position wherein it rests upon said valve seat and an open-valve position wherein it is positioned axially from said valve seat, means forming a wall of nonmagnetic material in general alignment with the path of movement of said ball to and from said closed-valve position, and operating means to move said ball from said closed-valve position including a magnet which provides a magnetic field extending through said wall.

7. A valve construction as described in claim 6 wherein said magnet is generally cylindrical with its axis in alignment with said discharge passageway and wherein said operating means includes a compression spring urging said magnet toward said discharge passageway.

8. A valve construction as described in claim 7 which includes a header positioned radially outwardly with respect to the axis of said discharge passageway, and a plurality of additional valve constructions each having a valve passageway from said header.

References Cited

UNITED STATES PATENTS

| | | | |
|---|---|---|---|
| 2,233,659 | 3/1921 | Wittmann | 137—65 X |
| 2,693,933 | 11/1954 | Meinke | 251—65 |

FOREIGN PATENTS

| | | |
|---|---|---|
| 815,028 | 6/1959 | Great Britain. |

WALTER A. SCHEEL, *Primary Examiner.*

LEON G. MACHLIN, *Assistant Examiner.*